(12) United States Patent
Gajulapalli et al.

(10) Patent No.: US 9,536,076 B2
(45) Date of Patent: Jan. 3, 2017

(54) SOFTWARE VERIFICATION FOR AUTOMATIC TRAIN OPERATION

(71) Applicant: Electro-Motive Diesel, Inc., LaGrange, IL (US)

(72) Inventors: Venkata Swamy Reddy Gajulapalli, Naperville, IL (US); Russell Kubycheck, Claredon Hills, IL (US); James Seaton, Westmont, IL (US); Alexander Shubs, Jr., Chicago, IL (US); Ola Tannous, LaGrange, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 0 days.

(21) Appl. No.: 14/689,448

(22) Filed: Apr. 17, 2015

(65) Prior Publication Data
US 2016/0306960 A1 Oct. 20, 2016

(51) Int. Cl.
*G06F 21/44* (2013.01)
*B61L 99/00* (2006.01)
*B60W 50/04* (2006.01)

(52) U.S. Cl.
CPC ............ *G06F 21/44* (2013.01); *B60W 50/045* (2013.01); *B61L 99/00* (2013.01)

(58) Field of Classification Search
CPC ........ G06F 21/44; B60W 50/045; B61L 99/00
USPC .......................................................... 701/19
See application file for complete search history.

(56) References Cited

U.S. PATENT DOCUMENTS

| | | |
|---|---|---|
| 6,580,975 B2 | 6/2003 | Lovelace, II et al. |
| 6,647,356 B2 | 11/2003 | Pierro et al. |
| 6,876,907 B2 | 4/2005 | Kanner et al. |
| 7,133,756 B2 | 11/2006 | Jammu et al. |
| 7,188,341 B1 | 3/2007 | Hawthorne et al. |
| 7,280,013 B2 | 10/2007 | Lewis |
| 7,908,047 B2 | 3/2011 | Smith et al. |
| 8,364,338 B2 | 1/2013 | Peltonen et al. |
| 8,655,505 B2 | 2/2014 | Sprock et al. |
| 8,868,267 B2 | 10/2014 | Deitz et al. |
| 2008/0244555 A1 | 10/2008 | Welvaert et al. |
| 2010/0029209 A1 | 2/2010 | Daum et al. |
| 2010/0204856 A1 | 8/2010 | Smith et al. |
| 2012/0123617 A1 | 5/2012 | Noffsinger et al. |
| 2013/0113579 A1 | 5/2013 | Barnas et al. |
| 2013/0179689 A1* | 7/2013 | Matsumoto ............... G06F 8/61 713/171 |

(Continued)

*Primary Examiner* — McDieunel Marc
*Assistant Examiner* — James E Stroud
(74) *Attorney, Agent, or Firm* — Finnegan, Henderson, Farabow, Garrett & Dunner, LLP

(57) ABSTRACT

An automatic train operation system includes a first control system configured to run a first software for controlling a first vehicle subsystem and a second control system configured to run a second software for controlling a second vehicle subsystem. The automatic train operation system also includes a software verification controller. The software verification controller is configured to identify a first identifier of the first software and a second identifier of the second software as a software configuration and determine whether the software configuration is preapproved. The software verification controller is also configured to, if the software configuration is preapproved, authorize the first control system and the second control system to run the first and second software.

17 Claims, 3 Drawing Sheets

(56) References Cited

U.S. PATENT DOCUMENTS

| | | | |
|---|---|---|---|
| 2014/0059534 A1* | 2/2014 | Daum | G06F 8/65 |
| | | | 717/172 |
| 2014/0117167 A1 | 5/2014 | Donnelly, III | |
| 2014/0336851 A1 | 11/2014 | Kadono et al. | |
| 2015/0006443 A1* | 1/2015 | Rose | G06N 99/005 |
| | | | 706/12 |
| 2015/0012750 A1* | 1/2015 | Matsumoto | H04L 63/0876 |
| | | | 713/171 |
| 2016/0098561 A1* | 4/2016 | Keller | G06F 21/567 |
| | | | 726/24 |

* cited by examiner

SOFTWARE VERIFICATION FOR AUTOMATIC TRAIN OPERATION

TECHNICAL FIELD

This disclosure relates generally to automatic train operation and, more specifically, to a system and method for verifying software to be used as part of an automatic train operation system.

BACKGROUND

A goal of automatic train operation systems is to eliminate the need for an operator aboard the locomotive. Automatic train operation systems may integrate multiple control systems with an end result of driverless operation of the locomotive. The system must be accompanied by proven safety cases and software validation. As such, only specific, approved combinations of control system software will be allowed to be used. There exists a need for a method of enforcing the required software combinations onboard the locomotive.

One proposed implementation of software validation is described in U.S. Patent Application Publication No. 2014/036851 A1 ("the '851 publication"). The train information managing apparatus of the '851 publication operates according to predetermined control software. Software is also used in the devices in other cars that are communicatively connected to the central train information managing apparatus, which runs the control software. Train information managing apparatuses each include a plurality of pieces of control software of versions different from each other. When functions related to each other in the control software of the train information managing apparatus and the software used in the devices are improved, it is necessary to simultaneously update the control software and the software of the devices. The train information managing apparatus compares version information of software for all devices in a formation and version correspondence information included in each of the plurality of pieces of control software. Then, the train information managing apparatus discriminates control software including version correspondence information consistent with the version information of the software for all the devices in the formation. When the discriminated, or preferred, control software is different from already-started control software, the train information managing apparatus selects and starts the discriminated control software, and transmits a switching command for switching from the already-started control software to the discriminated control software to all of the devices in the formation.

The method and system provided by the '851 publication may be subject to a number of possible drawbacks. For example, the method and system of the '851 publication only provides for version control of the same type of software running on different devices. It does not provide a means of coordinating multiple versions of multiple types of software running on different subsystems within a larger system. Further, it does not provide a mechanism for verifying the proper software prior to operating the locomotive. There is no safety mechanism in place to prevent the locomotive from running if it is using unauthorized software.

The presently disclosed systems and methods are directed to overcoming one or more of the problems set forth above and/or other problems in the art.

SUMMARY

In one aspect, this disclosure is directed to an automatic train operation system. The automatic train operation system may include a first control system configured to run a first software for controlling a first vehicle subsystem and a second control system configured to run a second software for controlling a second vehicle subsystem. The automatic train operation system may also include a software verification controller. The software verification controller may be configured to identify a first identifier of the first software and a second identifier of the second software as a software configuration and determine whether the software configuration is preapproved. The software verification controller may also be configured to, if the software configuration is preapproved, authorize the first control system and the second control system to run the first and second software.

According to another aspect, this disclosure is directed to vehicle including a first vehicle subsystem and a second vehicle subsystem. The vehicle may include a first control system configured to run a first software for controlling the first vehicle subsystem. The vehicle may also include a second control system configured to run a second software for controlling the second vehicle subsystem. The vehicle may also include a software verification controller configured to identify a first identifier of the first software and a second identifier of the second software as a software configuration. The software verification controller may be configured to determine whether the software configuration is preapproved and, if the software configuration is preapproved, authorize the first control system and the second control system to run the first and second software.

According to another aspect, this disclosure is directed to method for verifying a software configuration. The method may include identifying a first identifier of a first software to be run on a first system and a second identifier of a second software to be run on a second system as the software configuration. The method may include determining whether the software configuration is present in a first database and a second database. The method may also include, if the software configuration is present in both the first database and the second database, authorizing the first system and the second system to operate.

DETAILED DESCRIPTION

Reference will now be made in detail to the exemplary embodiments implemented according to the disclosure, the examples of which are illustrated in the accompanying drawings. Wherever possible, the same reference numbers will be used throughout the drawings to refer to the same or like parts.

Figure 1:
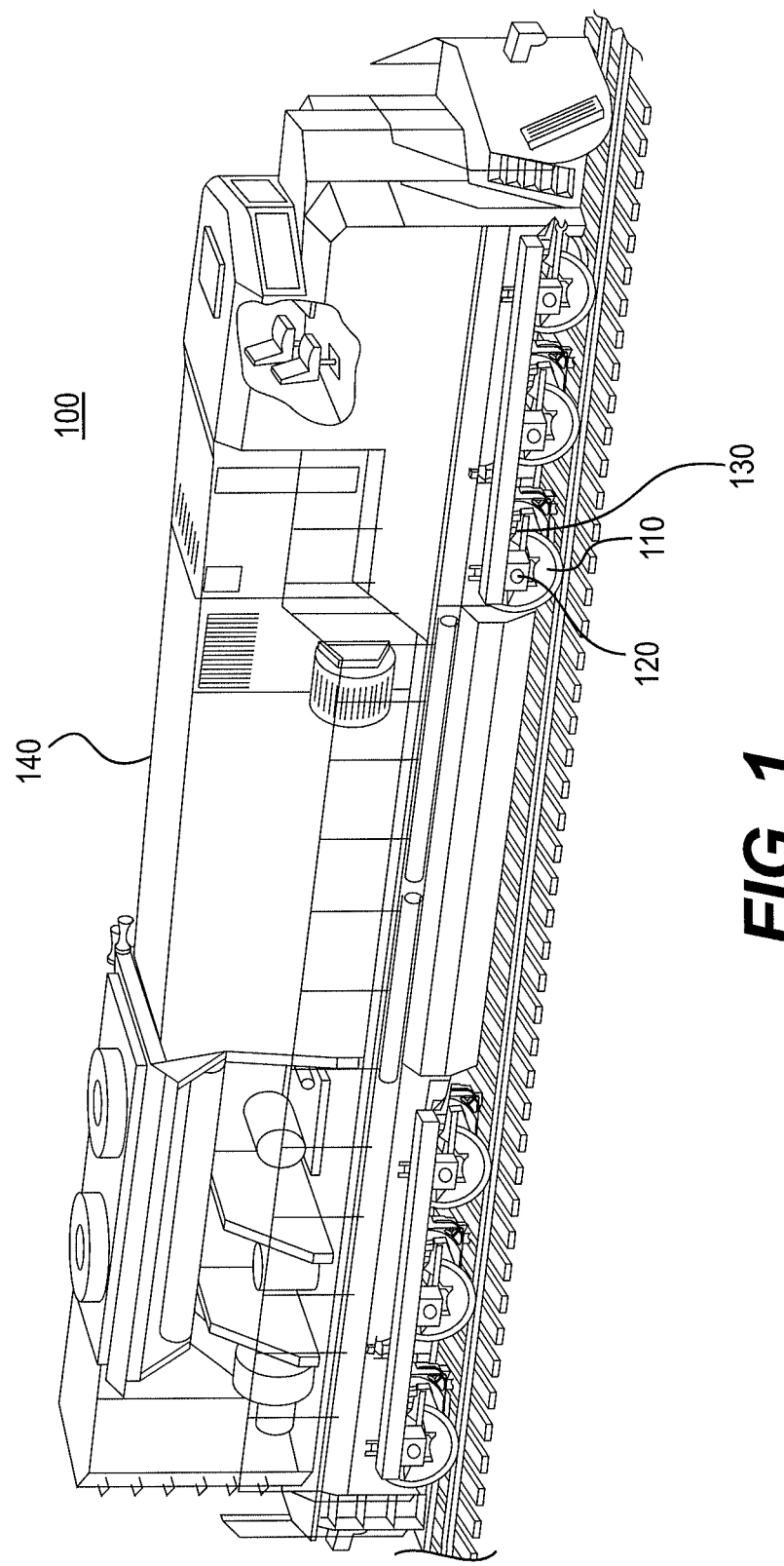
FIG. 1 provides an exemplary embodiment of a locomotive.
Figure 2:
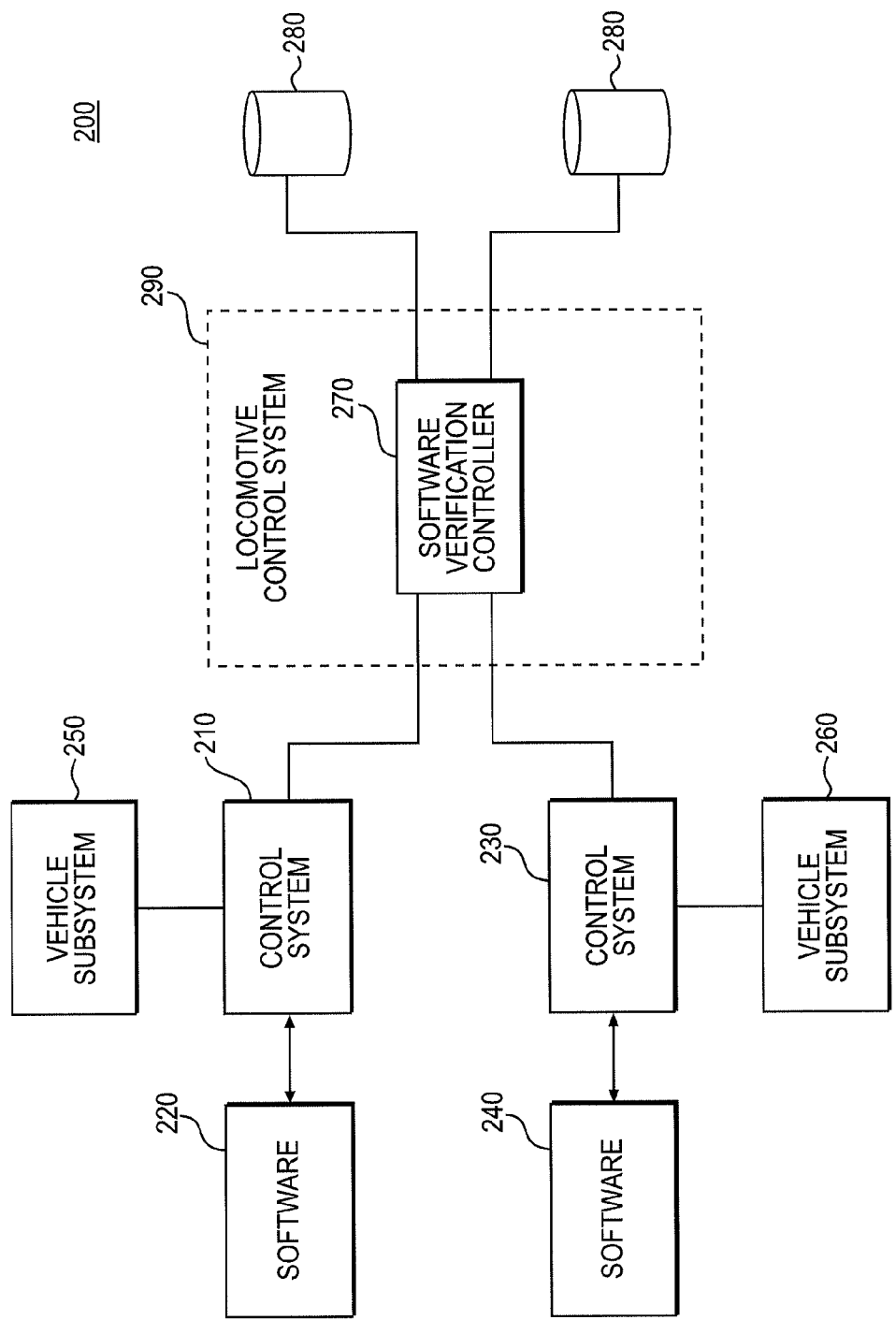
FIG. 2 is a schematic of a software verification system.

FIG. 1 shows an exemplary vehicle, for example, a locomotive 100, in which systems and methods for automatic train operation may be implemented consistent with the disclosed exemplary embodiments. For example, locomotive 100 may be any electrically powered rail vehicle employing alternating-current traction motors for propulsion. According to the exemplary embodiment illustrated in FIG. 1, locomotive 100 may include a pair of wheels 110 connected to an axle 120. Locomotive may also include a braking system 130 associated with wheels 110. Locomotive 100 may include other vehicle subsystems, such as an engine system 140 to operate locomotive 100. Locomotive 100 may also include an automatic train operation system 200. An exemplary automatic train operation system 200 is illustrated in FIG. 2.

Automatic train operation system 200 may include a plurality of control systems to control subsystems of locomotive 100. For example, automatic train operation system 200 may include a first control system 210 configured to run a first software 220. First control system 210 may be configured to control a system of locomotive 100, such as first vehicle subsystem 250. Automatic train operation system 200 may also include a second control system 230 configured to run a second software 240 for controlling a second vehicle subsystem 260. First control system 210 and second control system 230 may control a variety of locomotive subsystems, including, for example, systems for dynamic braking, air brakes, throttle, propulsion, cooling, power, monitoring, communication, and user interface. For example, first vehicle subsystem 250 may be braking system 130 and/or engine system 140.

For each type of first control system 210, there may be multiple types and multiple versions of first software 220 that first control system 210 may run. First software 220 may have a first identifier that includes the type and/or version of first software 220. Similarly, second software 240 may have a second identifier that includes the type and/or version of second software 240. Different combinations of first software 220 and second software 240 may be tested for operability and safety. For example, prior testing may have confirmed the operability and safety of a combination of version 2.0 of first software 220 with version 2.5 of second software 240. It may be desirable to permit only preapproved combinations of software to run on locomotive 100. A software verification controller 270 may be configured to confirm the combination of first software 220 and second software 240, also referred to as the software configuration, is preapproved prior to allowing locomotive 100 to operate.

During testing and/or system design, different software configurations may have been tested and confirmed safe for real-world application. It may be advantageous to keep track of software configurations that have been approved. This information may be stored in a database 280. Optionally, database 280 may also store software configurations that have been rejected. Software verification controller 270 may use database 280 to verify a software configuration.

According to some embodiments, software verification controller 270 may be configured to determine a first identifier of first software 220 and a second identifier of second software 240 as a software configuration. As discussed above, the first identifier and the second identifier may refer to the type and/or version of first software 220 and second software 240, respectively. This may include querying first control system 210 and second control system 230 to determine the first identifier and the second identifier. Additionally or alternatively, software verification controller 270 may determine the software configuration based on data received from a locomotive control system 290. Software verification controller 270 may communicate with, and/or be a part of, locomotive control system 290.

Software verification controller 270 may also be configured to determine whether the software configuration is preapproved. This may include, for example, determining whether the software configuration matches an entry in database 280 of preapproved software configurations. Additionally or alternatively, this may include querying other systems associated with locomotive 100, including a back office, locomotive control system 290, or any other signaling system containing data regarding the preapproved configurations of first software 220 and second software 240. To determine if the software configuration is preapproved, software verification controller 270 may be configured to crosscheck a plurality of sources. For example, software verification controller 270 may be configured to check a plurality of databases 280 of preapproved software configurations. Further, software verification controller 270 may be configured to determine that the software configuration is not preapproved if the software configuration is not included in each of the plurality of databases 280. For example, software verification controller 270 may check three databases 280 and conclude that the software configuration is preapproved only if the software configuration is included in all three databases 280.

Software verification controller 270 may be configured to authorize first control system 210 and second control system 230 to run first software 220 and second software 240, respectively, if the software configuration is preapproved. Software verification controller 270 may be configured to do this by communicating an authorization signal to locomotive control system 290. Additionally or alternatively, software verification controller 270 may communicate the approval of the software configuration directly to first control system 210 and/or second control system 230. If software verification controller 270 determines that the software configuration is not preapproved, software verification controller 270 may be configured to send a signal indicating verification failure. For example, software verification controller 270 may communicate this information to first control system 210, second control system 230, locomotive control system 290, and/or a back office system associated with locomotive 100.

Figure 3:
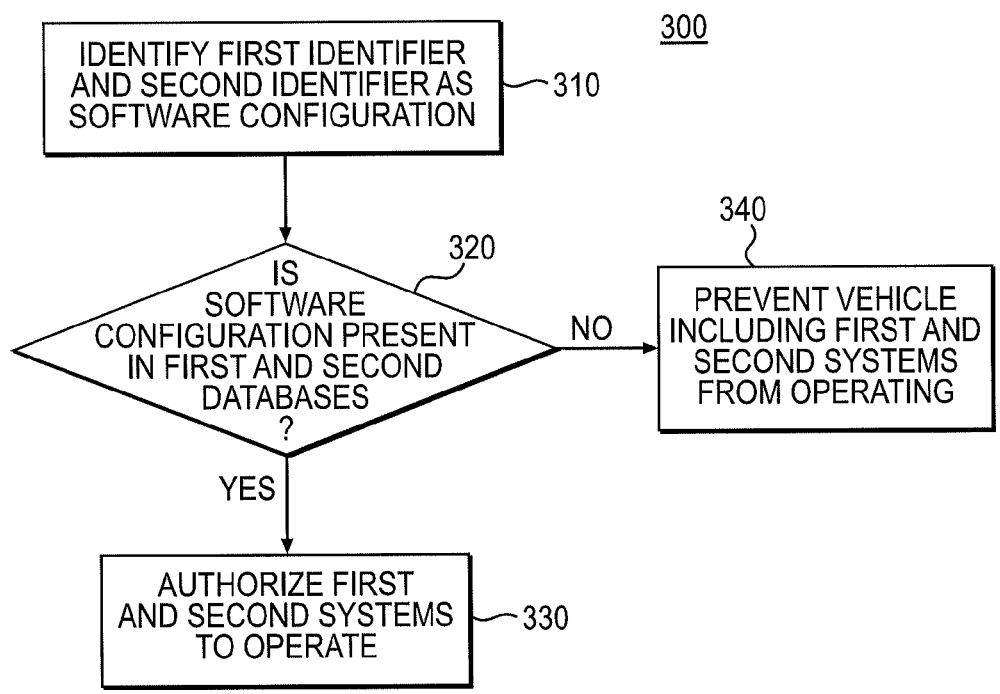
FIG. 3 is flowchart of a process for verifying a software configuration.

FIG. 3 illustrates a computer-implemented method 300 for verifying a software configuration. At step 310, software verification controller 270 may identify the first identifier associated with first software 220 of first control system 210 and second identifier associated with second software 240 of second control system 230 as a software configuration. As discussed above, first and second identifiers may identify the type and/or version of first software 220 and second software 240, respectively.

At step 320, software verification controller 270 may be configured to determine whether the software configuration is present in first database 280 and second database 280. As discussed above, databases 280 may include preapproved software configurations. If the software configuration is present in both first database 280 and second database 280, at step 330 software verification controller 270 may authorize first control system 210 and second control system 230 to operate. Additionally or alternatively, software verification controller 270 may authorize first vehicle subsystem 250 and second vehicle subsystem 260 to operate. If the software configuration is not present in both first database 280 and second database 280, at step 340, software verification controller 270 may prevent locomotive 100 including first vehicle subsystem 250 and second vehicle subsystem 260 from operating. Depending on the function of first vehicle subsystem 250 and second vehicle subsystem 260, it may be dangerous to operate at least some other systems of locomotive 100. Thus, software verification controller 270 may prevent other systems besides first vehicle subsystem 250 and second vehicle subsystem 260 from operating if the software configuration for first vehicle subsystem 250 and second vehicle subsystem 260 is not preapproved.

Optionally, if the software configuration is not in both first database 280 and second database 280, method 300 may include displaying the software configuration and at least one preapproved configuration of first database 280. For example, this may include displaying the preapproved configuration that is closest or most similar to the software configuration. Additionally or alternatively, this may include displaying the software configuration and at least one pre-approved software configuration from one of the first and second databases that is identified as an acceptable substitute for the software configuration. A user or operator may use this information to change first software 220 and/or second software 240 so that software configuration matches the displayed preapproved configuration.

Embodiments herein include computer-implemented methods, systems, and user interfaces. The computer-implemented methods may be executed, for example, by at least one processor that receives instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory on which information or data readable by at least one processor may be stored. Examples include random-access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may include any type of computer-readable storage medium unless otherwise specified. A computer-readable storage medium may store instructions for execution by at least one processor, including instructions for causing the processor to perform steps or stages consistent with embodiments herein. Additionally, one or more computer-readable storage mediums may be utilized in implementing a computer-implemented method. The term "computer-readable storage medium" should be understood to include tangible items and exclude carrier waves and transient signals.

INDUSTRIAL APPLICABILITY

The disclosed systems and methods provide a robust solution for verifying software to be used for automatic train operation. The presently disclosed systems and methods may have several advantages over other attempted solutions. For example, the disclosed systems and methods provide a verification system for addressing different combinations of software where the version and software type to be run on different subsystems differ from one another. This allows for the safe operation of vehicles including multiple types of systems by verifying not only the individual systems but also the specific combination of these systems prior to operation of the vehicle. Further, the disclosed systems and methods provide a protection against operation of the vehicle itself if even a subset of the software configuration is not preapproved. This ensures safety by preventing a vehicle from operating under untested conditions.

It will be apparent to those skilled in the art that various modifications and variations can be made to the automatic train operation software verification systems and associated methods for operating the same. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. An automatic train operation system comprising:
   a first control system configured to run a first software for controlling a first vehicle subsystem;
   a second control system configured to run a second software for controlling a second vehicle subsystem;
   a software verification controller configured to:
      identify a first identifier of the first software and a second identifier of the second software as a software configuration;
      query a plurality of databases that each contain data regarding preapproved software configurations including combinations of at least one of different types and different versions of software that have been tested for operability and safety when used together on at least two vehicle subsystems;
      determine whether the software configuration is preapproved by comparing the first identifier of the first software and the second identifier of the second software to the data regarding preapproved software configurations in at least two of the plurality of databases and determining whether the software configuration matches entries in at least two of the plurality of databases; and
      if the software configuration is preapproved, authorize the first control system and the second control system to run the first and second software by communicating an authorization signal either directly or indirectly to at least one of the first control system and the second control system.

2. The automatic train operation system of claim 1, wherein the first identifier and the second identifier each includes a software version number.

3. The automatic train operation system of claim 1, wherein the software verification controller is further configured to, if the software configuration is not preapproved, send a signal indicating verification failure.

4. The automatic train operation system of claim 1, wherein the software verification controller is part of a locomotive control system.

5. The automatic train operation system of claim 1, wherein the software verification controller is configured to authorize the first control system and the second control system to run the first and second software by communicating an authorization signal to a locomotive control system.

6. The automatic train operation system of claim 1, wherein to determine whether the software configuration is preapproved, the software verification controller is further configured to:
   check a plurality of databases of preapproved software configurations; and
   if the software configuration is not included in each of the plurality of databases, determine that the software configuration is not preapproved.

7. A vehicle comprising:
   a first vehicle subsystem and a second vehicle subsystem;
   a first control system configured to run a first software for controlling the first vehicle subsystem;
   a second control system configured to run a second software for controlling the second vehicle subsystem; and
   a software verification controller configured to:

identify a first identifier of the first software and a second identifier of the second software as a software configuration;

query a plurality of databases that each contain data regarding preapproved software configurations including combinations of at least one of different types and different versions of software that have been tested for operability and safety when used together on at least two vehicle subsystems;

determine whether the software configuration is preapproved by comparing the first identifier of the first software and the second identifier of the second software to the data regarding preapproved software configurations in at least two of the plurality of databases and determining whether the software configuration matches entries in at least two of the plurality of databases; and if the software configuration is preapproved, authorize the first control system and the second control system to run the first and second software by communicating an authorization signal either directly or indirectly to at least one of the first control system and the second control system.

8. The vehicle of claim 7, wherein the first identifier and the second identifier each include a software version number.

9. The vehicle of claim 7, wherein the software verification controller is further configured to, if the software configuration is not preapproved, send a signal indicating verification failure.

10. The vehicle of claim 7, wherein the software verification controller is part of a locomotive control system.

11. The vehicle of claim 7, wherein the software verification controller is configured to authorize the first control system and the second control system to run the first and second software by communicating an authorization signal to a locomotive control system.

12. The vehicle of claim 7, wherein to determine whether the software configuration is preapproved, the software verification controller is further configured to:

check a plurality of databases of preapproved software configurations; and if the software configuration is not included in each of the plurality of databases, determine that the software configuration is not preapproved.

13. A method for verifying a software configuration comprising:

identifying, using a controller, a first identifier of a first software to be run on a first system and a second identifier of a second software to be run on a second system as the software configuration;

querying, using the controller, a plurality of databases that each contain data regarding preapproved software configurations including combinations of at least one of different types and different versions of software that have been tested for operability and safety when used together on at least two vehicle subsystems;

determining whether the software configuration is present in a first database and a second database of the plurality of databases by using the controller to compare the first identifier of the first software and the second identifier of the second software to the data regarding preapproved software configurations in the first and second databases and determining with the controller whether the software configuration matches entries in the first and second databases; and if the software configuration is present in both the first database and the second database, authorizing the first system and the second system to operate by communicating an authorization signal using the controller either directly or indirectly to at least one of the first system and the second system.

14. The method of claim 13, wherein authorizing the first system and the second system to operate includes communicating an authorization signal to a vehicle control system.

15. The method of claim 13, further including, if the software configuration is not present in both the first database and the second database, preventing a vehicle including the first system and the second system from operating.

16. The method of claim 13, further including, if the software configuration is not present in both the first database and the second database, displaying the software configuration and at least one preapproved configuration from one of the plurality of databases that is identified as an acceptable substitute for the software configuration.

17. The method of claim 13, wherein the first identifier includes a software type and a software version.

* * * * *